(12) United States Patent
Hinninger et al.

(10) Patent No.: US 8,310,353 B2
(45) Date of Patent: Nov. 13, 2012

(54) VEHICLE BLIND SPOT DETECTION AND INDICATOR SYSTEM

(75) Inventors: Christopher Hinninger, Dublin, OH (US); Makoto Murata, Dublin, OH (US); Masahito Shingyoji, Sakado (JP); Fumie Nakamura, Shioya-gun (JP); Yasuhiko Fujita, Nasushiobara (JP)

(73) Assignee: Honda Motor Co., Ltd., Tokyo (JP)

( * ) Notice: Subject to any disclaimer, the term of this patent is extended or adjusted under 35 U.S.C. 154(b) by 948 days.

(21) Appl. No.: 12/257,046

(22) Filed: Oct. 23, 2008

(65) Prior Publication Data

US 2009/0243822 A1    Oct. 1, 2009

Related U.S. Application Data

(60) Provisional application No. 61/040,825, filed on Mar. 31, 2008.

(51) Int. Cl.
*B60Q 1/00* (2006.01)
*G08B 21/00* (2006.01)
*G08G 1/00* (2006.01)
*G06F 17/10* (2006.01)

(52) U.S. Cl. ..... 340/435; 340/436; 340/438; 340/686.1; 340/686.6; 340/903; 701/301; 701/302

(58) Field of Classification Search .......... None
See application file for complete search history.

(56) References Cited

U.S. PATENT DOCUMENTS

| | | | |
|---|---|---|---|
| 3,360,775 A | 12/1967 | Schroeder | |
| 4,349,823 A * | 9/1982 | Tagami et al. | 342/70 |
| 4,694,295 A | 9/1987 | Miller et al. | |
| 5,173,881 A | 12/1992 | Sindle | |
| 5,235,316 A * | 8/1993 | Qualizza | 340/436 |
| 5,313,335 A | 5/1994 | Gray et al. | |
| 5,339,075 A * | 8/1994 | Abst et al. | 340/903 |
| 5,517,196 A | 5/1996 | Pakette et al. | |
| 5,786,772 A | 7/1998 | Schofield et al. | |
| 6,072,391 A | 6/2000 | Suzuki et al. | |
| 6,400,308 B1 | 6/2002 | Bell et al. | |
| 6,433,679 B1 * | 8/2002 | Schmid | 340/435 |
| 6,606,027 B1 * | 8/2003 | Reeves et al. | 340/436 |
| 6,744,353 B2 | 6/2004 | Sjonell | |
| 6,911,642 B2 * | 6/2005 | Sartori et al. | 250/208.2 |
| 6,927,677 B2 | 8/2005 | Anderson et al. | |

(Continued)

FOREIGN PATENT DOCUMENTS

BE    1014526    12/2003

(Continued)

OTHER PUBLICATIONS

European Search Report of European S/N 09156093.8 dated Jun. 22, 2012.

(Continued)

*Primary Examiner* — Julie Lieu
(74) *Attorney, Agent, or Firm* — Mark E. Duell; Rankin, Hill & Clark LLP

(57) ABSTRACT

A warning system for conveying alerts and information relating to a vehicle blind spot and objects detected therein, is disclosed. The system conveys an assortment of information through a single light emitting indicator. Also disclosed are various methods of indicating the advisability of lane changes, and modes of configuring the indicator and an associated sensing system and controller.

11 Claims, 10 Drawing Sheets

U.S. PATENT DOCUMENTS

| | | |
|---|---|---|
| 7,385,486 B2 | 6/2008 | Danz et al. |
| 7,432,800 B2 * | 10/2008 | Harter et al. ............... 340/436 |
| 2004/0178892 A1 | 9/2004 | Anderson |
| 2005/0195383 A1 * | 9/2005 | Breed et al. ................ 356/4.01 |
| 2005/0232469 A1 | 10/2005 | Schofield |
| 2006/0006988 A1 * | 1/2006 | Harter et al. ............... 340/435 |
| 2006/0206243 A1 * | 9/2006 | Pawlicki et al. ................ 701/1 |
| 2006/0250297 A1 * | 11/2006 | Prakah-Asante et al. ....... 342/70 |
| 2007/0152803 A1 | 7/2007 | Huang et al. |
| 2008/0040004 A1 * | 2/2008 | Breed ......................... 701/45 |
| 2008/0309515 A1 * | 12/2008 | la Tendresse et al. ........ 340/901 |
| 2011/0080277 A1 * | 4/2011 | Traylor et al. ............... 340/435 |

FOREIGN PATENT DOCUMENTS

| | | |
|---|---|---|
| JP | 2006-044295 | 2/2006 |
| JP | 2007-122536 | 5/2007 |
| JP | 2007-288328 | 11/2007 |
| WO | 90/13103 | 11/1990 |

OTHER PUBLICATIONS

Replacement European Search Report of European S/N 09156093.8 dated Jun. 25, 2012.

* cited by examiner

VEHICLE BLIND SPOT DETECTION AND INDICATOR SYSTEM

CROSS-REFERENCE TO RELATED APPLICATIONS

This application claims priority upon U.S. provisional application Ser. No. 61/040,825 filed Mar. 31, 2008.

BACKGROUND OF THE INVENTION

The presently disclosed embodiments are directed to the field of vehicle sensing and indication systems for conveying information to a driver as to the presence and proximity of one or more objects, such as other vehicles, in the driver's blind spot.

It is well known to provide driver warning systems in vehicles to warn of impending collisions. The prior art describes numerous systems that provide visual, audible, and tactile indications to a driver of a potential collision. The terms "blind spot" or "blind zone" as used in the prior art, generally refer to the rearward lateral regions along the left and right exterior sides of a vehicle. These regions are generally hidden from view of the driver when looking into the rear view and/or side mirror(s) of the vehicle.

U.S. Pat. No. 5,173,881 discloses a visual indicator using multiple lights located on a vehicle dash or instrument panel which conveys information from a vehicle proximity sensing system. The '881 patent also discloses a mode of operation in which the lights are flashed to convey a danger warning, based upon detected distances.

U.S. Pat. No. 6,433,679 relates to a warning device for monitoring a distance between a vehicle and an obstacle. Although the '679 patent is not specifically directed to a blind spot detection system, the patent provides various descriptions of visual warning systems. The '679 patent continues and describes warning signal elements that are located on the rear window and in view of the driver when backing up. The warning signal elements contain a collection of differently colored LED's. The system, upon detection of an obstacle at a distance, flashes all the LED's depending upon a calculated time to collision (TTC) value.

U.S. Pat. No. 6,927,677 is directed to a blind spot detector system. The patent describes a detection and indication system incorporated in a vehicle external rear view mirror. A single bi-color LED in the vehicle side mirror is illuminated green when the system is operational, solid red when calibration is required, and flashes red when an object is detected in the blind spot.

US Patent Publication 2006/0006988 relates to a warning display system that visually warns the driver of a vehicle of an object in a blind spot. The system detects or determines anticipated movement of the vehicle or object, and increases the degree of illumination of a warning indicator when the vehicle or object is approaching the driver.

Although satisfactory in many regards, prior art blind spot warning systems have used collections of multiple lights which may be different in color or vary in the number of lights that are illuminated to convey information to a driver. In addition, certain prior art systems employ audible alarms in conjunction with activation of one or more lights. The use of multiple lights, particularly those differing in color, or those emitting sounds, can distract a driver and thus become a safety hazard. This concern is heightened with the increasing amounts of information and data that are now typically presented to a driver. Accordingly, it would be desirable to provide an indication system that was simple yet which could convey an assortment of information, and which was less distracting than prior art collections of lights or those emitting audible alarms.

Blind spot detection systems typically provide a variety of information to a driver such as the presence of one or more objects in the blind zone, the location of the object(s) in the blind zone, the speed of the object(s), the operating condition of the detection system, and numerous other factors. Therefore, prior art blind spot indicator systems typically used multiple lights which were operated in certain fashions to convey particular information to the driver. As previously noted, the use of multiple lights can distract a driver. And depending upon how the multiple lights are configured, a driver may experience difficulty in remembering what each display pattern or mode of operation of the lights represents. In addition, providing multiple lights increases costs and is undesirable as a result of greater complexity and costs during maintenance or repair of the system. Accordingly, it would be desirable to provide a blind spot indicator system that could convey multiple information items in a simple manner, without the use of multiple lights.

Drivers often prefer that vehicle information be presented on the dash or instrument panel. This enables a driver to quickly assess multiple information items in a single glance. However, with the increasing amounts of electronics and associated controls and displays provided in vehicles, available area on the dash or instrument panel has decreased. For this reason, vehicle designers have located certain controls and indicators on other regions of the vehicle such as in external side mirrors or within the vehicle interior, such as on rearview mirrors or have used heads up displays. As noted in the various descriptions of prior art blind spot indication systems, incorporating one or more lights in the external side mirrors is common. Although beneficial in many regards, placement of such indicators in external mirrors is not always desirable particularly in environments where snow and ice can collect on such mirrors. Although such alternative locations and display strategies will likely continue to be used, it would be desirable to provide an indicator capable of conveying multiple items of information, which occupies only a relatively small area, thus enabling such indicator to be located on the dash or instrument panel where such area is at a premium.

SUMMARY OF THE INVENTION

The difficulties and drawbacks associated with previous-type systems are overcome in the present methods and apparatuses for a vehicle blind spot detection and indicator system.

In a first aspect, the present invention provides a vehicle blind spot detection and warning system. The system comprises a sensing system having (i) at least one sensor affixed to a vehicle and adapted to detect the presence and the proximity of an object in a detection area defined along a region laterally adjacent the vehicle, and (ii) a transmitter for transmitting a signal indicative of detection by said at least one sensor of an object in said detection area and proximity of said detected object from the vehicle. The system also comprises a single light emitting indicator located within the interior of the vehicle. And, the system comprises a controller in communication with the sensing system and the light emitting indicator. Upon detection of the presence and the proximity of an object in the detection area, the controller receives the transmitted signal and controls a flashing frequency of the single light emitting indicator.

In another aspect, the present invention provides a method for detecting the presence and proximity of an object in a detection area defined along a region laterally adjacent to a vehicle, and providing a visual indication of such presence and proximity. The method comprises sensing the presence of an object in the detection area and the proximity of the object from the vehicle. The method also comprises transmitting information as to the presence and proximity of the sensed object. And, the method further comprises selecting a flashing frequency of a single light emitting indicator based upon the transmitted information to thereby provide visual indication of the presence and the proximity of the sensed object to the vehicle.

In yet another aspect, the present invention provides a method for indicating advisability of a lane change to a driver of a vehicle by use of a single illuminating indicator. The vehicle includes a turn signal selectable between an on position and an off position and a blind spot detection and warning system adapted for detecting the presence of an object in a detection area defined along a rearward region laterally adjacent the vehicle. The method comprises assessing a state that the driver and vehicle are in, the state selected from the group consisting of (i) a first state in which the turn signal is off and no object is detected in the detection area, (ii) a second state in which the turn signal is off and an object is detected in the detection area, and (iii) a third state in which the turn signal is on and an object is detected in the detection area. The method also comprises controlling the operation of the single indicator such that if the first state is assessed, the indicator is not illuminated; if the second state is assessed, the indicator is continuously illuminated; and if the third state is assessed, the indicator is intermittently illuminated; to thereby indicate advisability of a lane change.

And in still another aspect, the present invention provides a method for indicating to a driver of a vehicle a degree of danger associated with a lane change by use of a single illuminating indicator. The vehicle includes a blind spot detection and warning system adapted for determining the proximity of an object in a detection area defined along a rearward region laterally adjacent the vehicle. The detection area is defined into at least two zones in which a first zone is nearest the vehicle and a second zone is farther from the vehicle than the first zone. The method comprises detecting whether an object is present in the detection area, and if so, determining which zone of the at least two zones the object is in. The method also comprises selecting a flashing frequency of the single illuminating indicator based upon the determination of which zone the object is in. The flashing frequency selected for the object being in the first zone is greater than the flashing frequency selected for the object being in the second zone, thereby indicating an elevated degree of danger.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
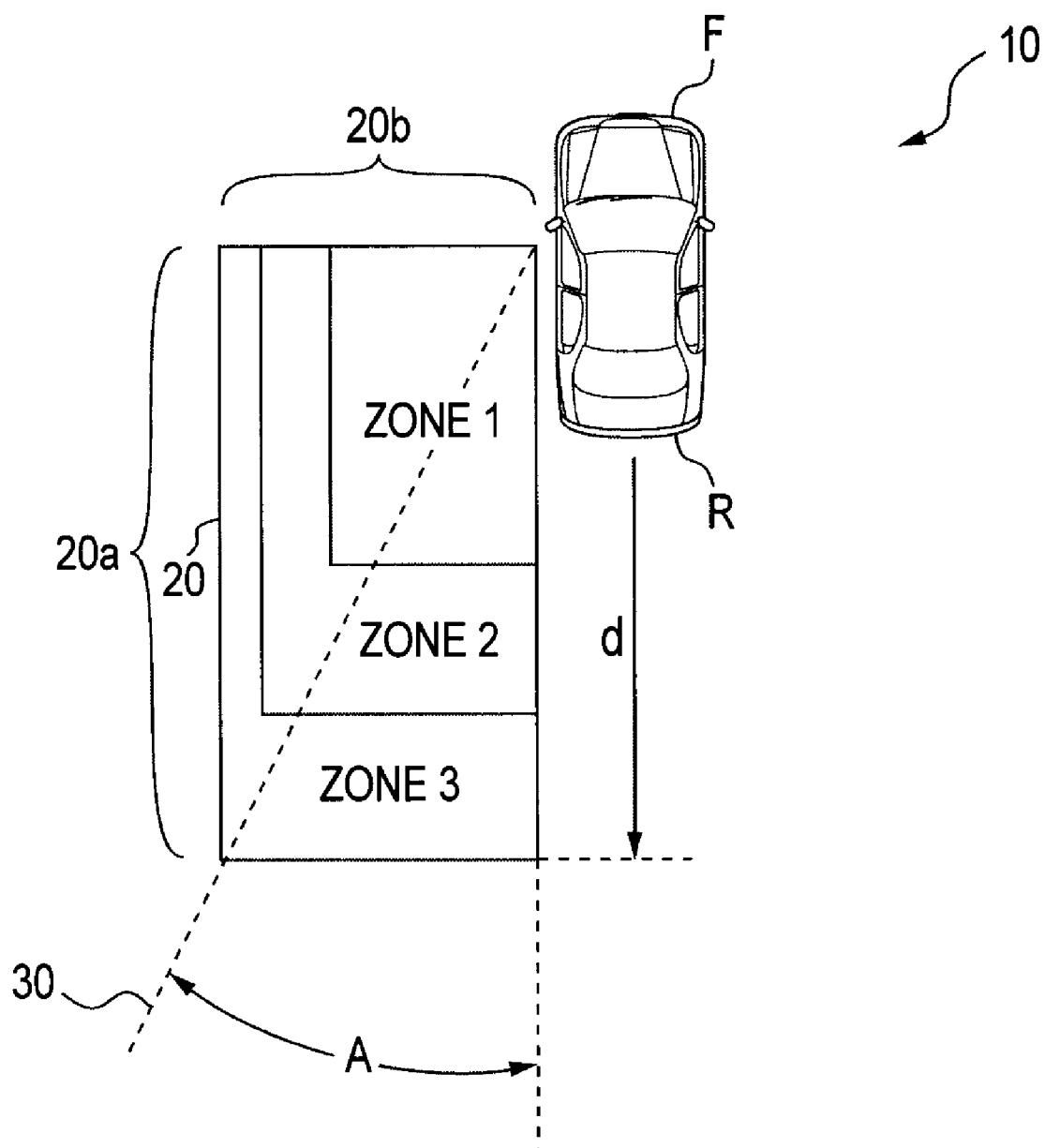
FIG. 1 is a schematic illustration of a vehicle showing a representative blind spot region, and a preferred embodiment detection area having three zones as described herein.

The present invention relates to vehicle blind spot detection and indicator systems. Specifically, the present invention is directed to light emitting indication systems for conveying information to a driver regarding the state of the blind zone and proximity of vehicle(s) therein. The invention is also directed to methods for detecting the presence and proximity of vehicle(s) in a blind zone and providing a visual indication of such presence and proximity to a driver. In addition, the invention is directed to methods for indicating advisability of a lane change to a driver. And, the present invention is directed to methods of indicating the degree of danger associated with a contemplated lane change.

The terms "blind spot" or "blind zone" as used herein refer to areas external to a vehicle that can not be seen by the driver of the vehicle while looking forward or through either the rear view or side mirrors. The areas typically referred to as blind spots are the rear quarter blind spots, i.e. the areas toward the rear of the vehicle on both sides. Other areas that are considered blind spots are areas to the left or right where the driver's side vision is hindered. More specifically, blind spots are typically in adjacent lanes of traffic that are blocked from the driver's view by various structures in the automobile. The physical limitations in the driver's eye movement and head and torso rotation make certain areas hidden from view to the driver. Blind spots in most automobiles and certain light trucks depend upon the configuration of the vehicle. For example, blind spots may exist in areas external to a vehicle which are blocked from view by the A pillar, which is between the front door and the windshield; the B pillar which is behind the front door; and the C pillar which is ahead of the rear windshield. In addition, areas between the driver's peripheral vision on the sides and the area that is covered by the rear view mirror may also constitute blind spots. As will be appreciated, large trucks and particularly tractor trailer trucks have very large blind spots such as regions on the sides of the cab extending alongside and rearward from a trailer if present.

Generally, the present invention provides a single blind spot indicator light, preferably located within the interior of a vehicle and most preferably located on the dashboard or instrument panel. An indicator and detection system conveys information as to whether a lane change is advisable based upon assessing various conditions. In a first state, when the turn signal is off and so a lane change is not intended, and no vehicle(s) in the blind spot is detected; the indicator is off, thereby indicating a lane change is permissible. In a second state, when a turn signal is still off, but a vehicle in the blind spot is detected; the indicator is lit in a continuous or "always on" fashion. In a third state, when the turn signal is on and a vehicle is detected in the blind spot; the indicator is flashed to warn the driver that a lane change is not advisable. Preferably, the frequency of flashing of the indicator in this third state is related to the proximity of the detected vehicle(s).

The present invention also conveys information to the driver as to the degree of danger that exists if an intended lane change (indicated by operation of a turn signal) is performed, based upon the proximity of the vehicle(s) in the blind spot. In accordance with the present invention, a blind spot is divided into multiple zones, and preferably three zones with a first zone being the closest to the driver and a third zone being the farthest. In a preferred embodiment of the present invention, the system increases the flashing frequency of the single indicator with increasing proximity of the detected vehicle(s). Thus, in a most preferred embodiment, the frequency of flashing is greater when a vehicle is detected in a second zone as compared to the third zone. And, the frequency of flashing is greater when a vehicle is detected in the first zone as compared to the second zone.

FIG. 1 is a schematic illustration of a vehicle 10 and a representative blind spot 30 extending laterally and rearwardly from the vehicle 10. The vehicle front is designated as F and the vehicle rear is designated as R. The blind spot 30 generally extends from the driver and expands rearward at an angle A, which may vary from driver to driver and may also be affected by the configuration of windows and pillars in the vehicle, position of the driver, weather conditions, and other factors. Typically, the blind spot angle A ranges from about 0° to about 45°, and conceivably from 0° to about 90°, taken from an axis parallel to the longitudinal axis of the vehicle 10 which typically coincides with the direction of travel.

In the event that vehicle 10 is equipped with a vehicle blind spot detection system, examples of which are described and referenced herein, the system will typically have a detection area 20 associated with the system. As shown in FIG. 1, the detection area 20 preferably includes or encompasses the blind spot 30 to some maximum distance d from the rear of the vehicle 10. This is preferred so that the system can detect objects such as other vehicles within the blind spot 30. The detection area 20 may also extend laterally beyond the blind spot 30 such as shown in FIG. 1. The detection area 20 may be in nearly any shape or configuration. As depicted in FIG. 1, the detection area 20 can be in the shape of a rectangle having a length 20a extending rearward from approximately the location of the driver, and a width 20b extending laterally outward also from the driver.

As described in greater detail herein, the detection area 20 may be divided into two or more zones. As shown in FIG. 1, the area can be partitioned or otherwise defined as including three zones such as zone 1, zone 2, and zone 3. The number of zones, their shapes, and relation to the detection area 20 can be varied depending upon numerous factors, such as described in greater detail herein.

Figure 2:
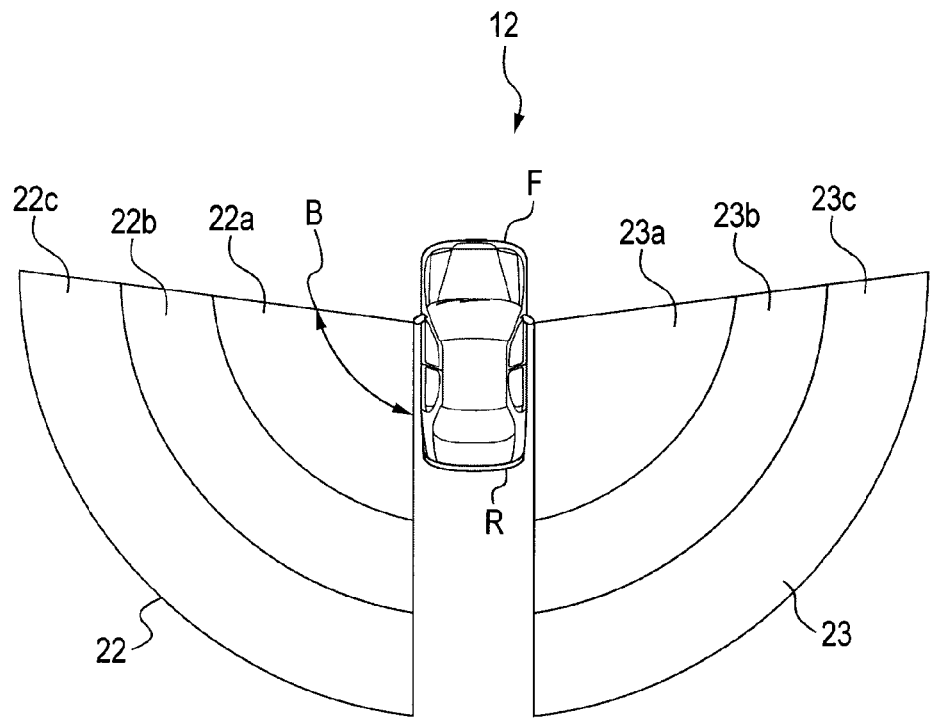
FIG. 2 is a schematic illustration of a vehicle having preferred embodiment zoned detection areas.

FIG. 2 schematically depicts another vehicle 12 and a preferred embodiment detection area 22 extending laterally and rearward from the vehicle 12. The detection area 22 includes at least three zones, such as zones 22a, 22b, and 22c. In this embodiment, the detection area may be positioned by multiple concentric arcs to define multiple zones. As will be appreciated, a corresponding detection area 23 may also exist on the other side of the vehicle 12 if the blind spot detection system provides for detection on that side of the vehicle. Similarly, the detection area 23 may also include one or more zones such as zones 23a, 23b, and 23c.

The collection of zones within a detection area may be equal or substantially so to one another. That is, each zone may cover or extend over, an equal amount of area. Or, one or more zones may be larger than other zones in the detection area. It is also contemplated that the areas of coverage of each zone increase in area, respectively farther from the vehicle. So, for example the area of a second zone farther from the vehicle than a first zone would have a larger area than the first zone. And, a third zone, father from the second zone, would have a larger area than the second zone. Or, the areas of coverage of each zone decrease in area, with regard to each zone farther from the vehicle. The particular configuration of each of the zones and their relation to the respective detection area depends upon the particular parameters of the vehicle and desired configuration.

Another aspect of most blind spot detection systems is the sweep or span of detection. This aspect is shown in FIG. 2 as sweep angle B. As will be appreciated, generally, a relatively large value is preferred for angle B, such as greater than 90° as depicted in FIG. 2. The sweep angle is generally taken about the location of the detection sensor.

Figure 3:
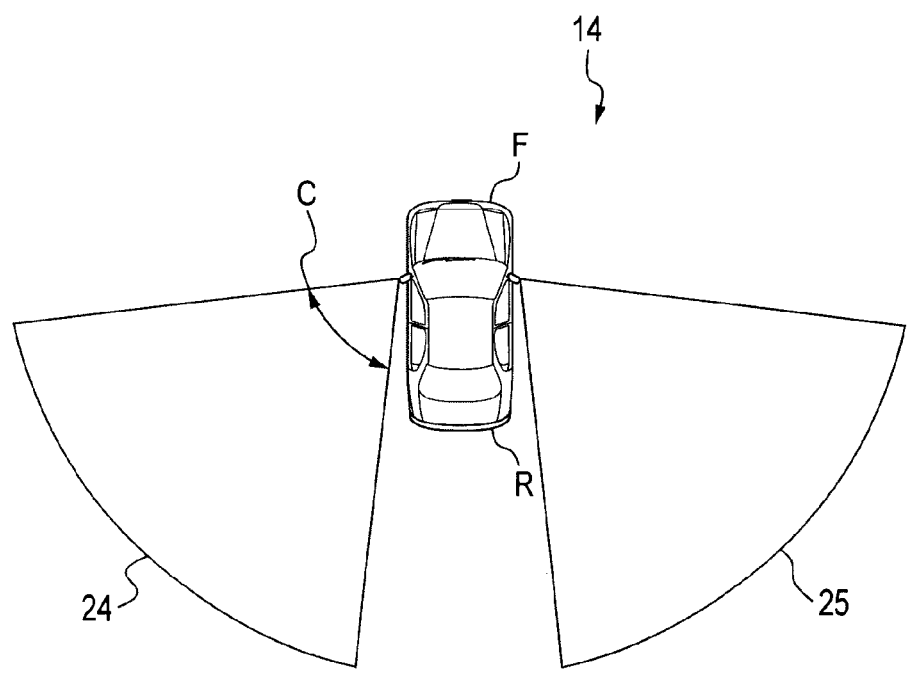
FIG. 3 is a schematic illustration of a vehicle having another set of preferred embodiment vehicle detection areas.

FIG. 3 is a schematic illustration of a vehicle 14 and additional preferred embodiment detection areas 24 and 25 extending therefrom. The sweep angle C associated with the system for vehicle 14 is less than the sweep angle B in FIG. 2. Also, FIG. 3 depicts a detection area that is not defined into multiple zones.

As previously noted, the present invention provides a single indicator, that is activated or otherwise operated to convey multiple items of information concerning the vehicle blind spot and objects such vehicles detected therein. The indicator can be located at nearly any position within view of the driver. It is preferred that the indicator be located within the vehicle interior and more preferably, located on the vehicle dashboard or instrument panel. Preferably, the single indicator is a light emitting indicator or illuminating element. The single indicator may emit light of nearly any wavelength in the visible spectrum, but it is generally preferred that the light color be consistent with other indicators or family of indicators on the vehicle dash or instrument panel. Representative preferred colors include but are not limited to red, yellow, blue, green, and white.

Figure 4:
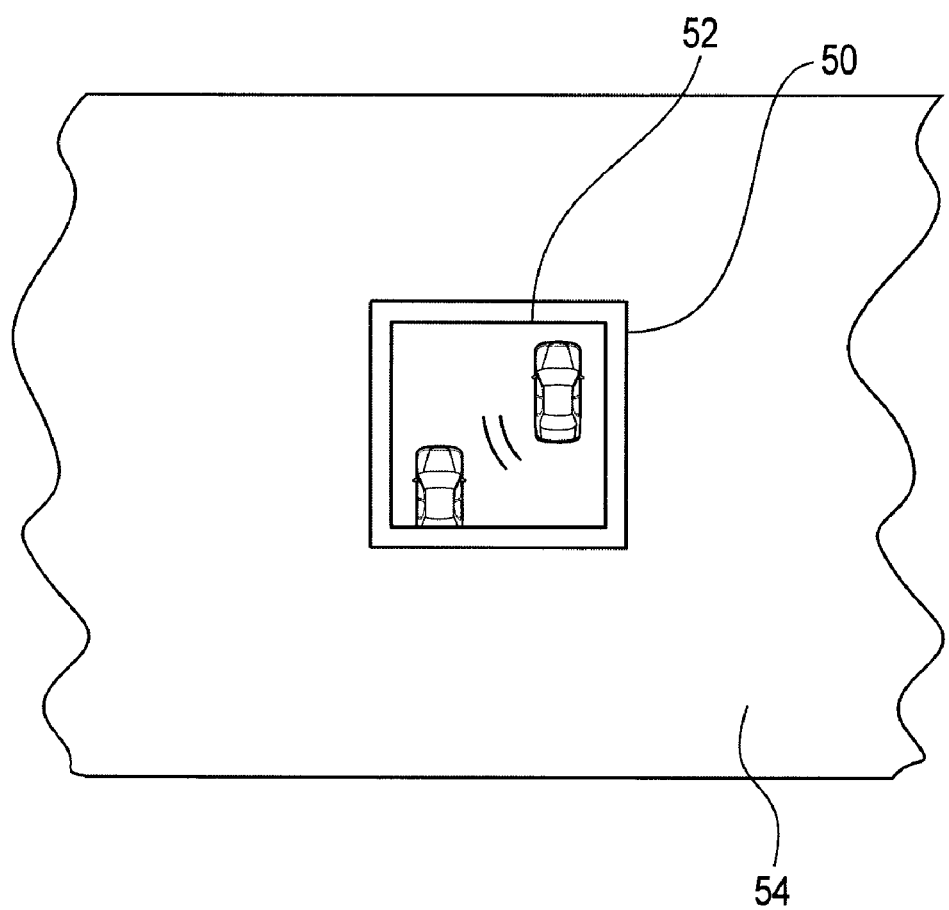
FIG. 4 is a front view of a preferred embodiment indicator such as located on a vehicle dash.

It may also be preferred to provide a cover or template containing indicia or markings over the indicator to provide a designation to the driver as to the nature of the indicator. For example, FIG. 4 illustrates a preferred embodiment indicator 50 mounted in a vehicle dashboard 54, and a cover plate 52 located over the indicator 50. FIG. 4 shows an exemplary symbolic representation for the vehicle blind spot indicator 50. The cover for example, may be in the form of a translucent, colored material having opaque markings or indicia that provide a symbolic designation of the indicator.

Figure 5:
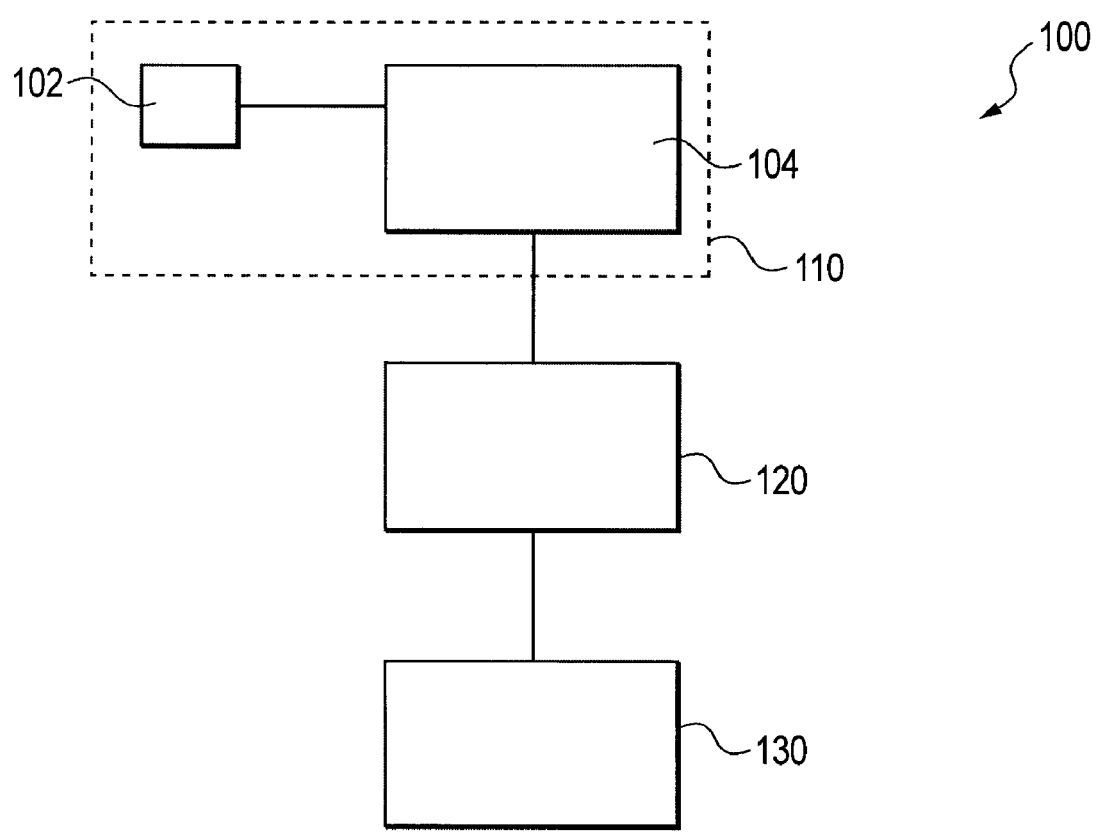
FIG. 5 is a schematic illustration of a preferred embodiment vehicle blind spot detection and indicator system.

The present invention also provides a vehicle blind spot detection and warning system. FIG. 5 is a schematic illustration of such a system 100. The system 100 comprises a sensing system 110 that includes at least one sensor 102 that is affixed to the vehicle, such as incorporated in a vehicle door mirror. The sensor(s) 102 may instead or in addition, be located along side and rear body portions of the vehicle. It is also contemplated to provide such sensor(s) 102 along the underside of the vehicle. The sensor(s) 102 is adapted to detect the presence of an object in a detection area generally extending along a lateral and/or rearward region adjacent to the vehicle. Preferably, the sensor(s) 102 is also adapted to detect, determine, or assist in determining the proximity of an object in the detection area. The sensing system 110 also includes a transmitter 104 and/or processing unit for receiving signals from the sensor(s) 102 and transmitting an electrical signal indicative of detection and preferably also of the proximity of objects in the detection area. The system 100 further comprises a controller 120 in communication with the transmitter 104, for receiving signals and information concerning the noted detection and proximity aspects. The controller 120 is preferably a microprocessor and configured as described in greater detail herein. The system 100 additionally comprises a single indicator 130 which is preferably a light emitting indicator. As shown in FIG. 5, the indicator 130 is in communication with the controller 120. However, the indicator 130 may also be in direct communication with the one or more sensor(s) 102, and the transmitter 104 and/or processing unit for the sensing system 110. The present invention also includes embodiments in which the controller 120 and the transmitter/processor 104 are combined and directly operate the indicator 130.

In operation of the system 100, and preferably upon detection of the presence and the proximity of an object in the detection area, by the sensing system 110 and specifically by the sensor(s) 102, the controller 120 receives a transmitted signal from the transmitter 104 and then controls the operation of the single indicator 130. As described in greater detail herein, preferably, the controller 120 controls a flashing frequency of the indicator 130.

Figure 6:
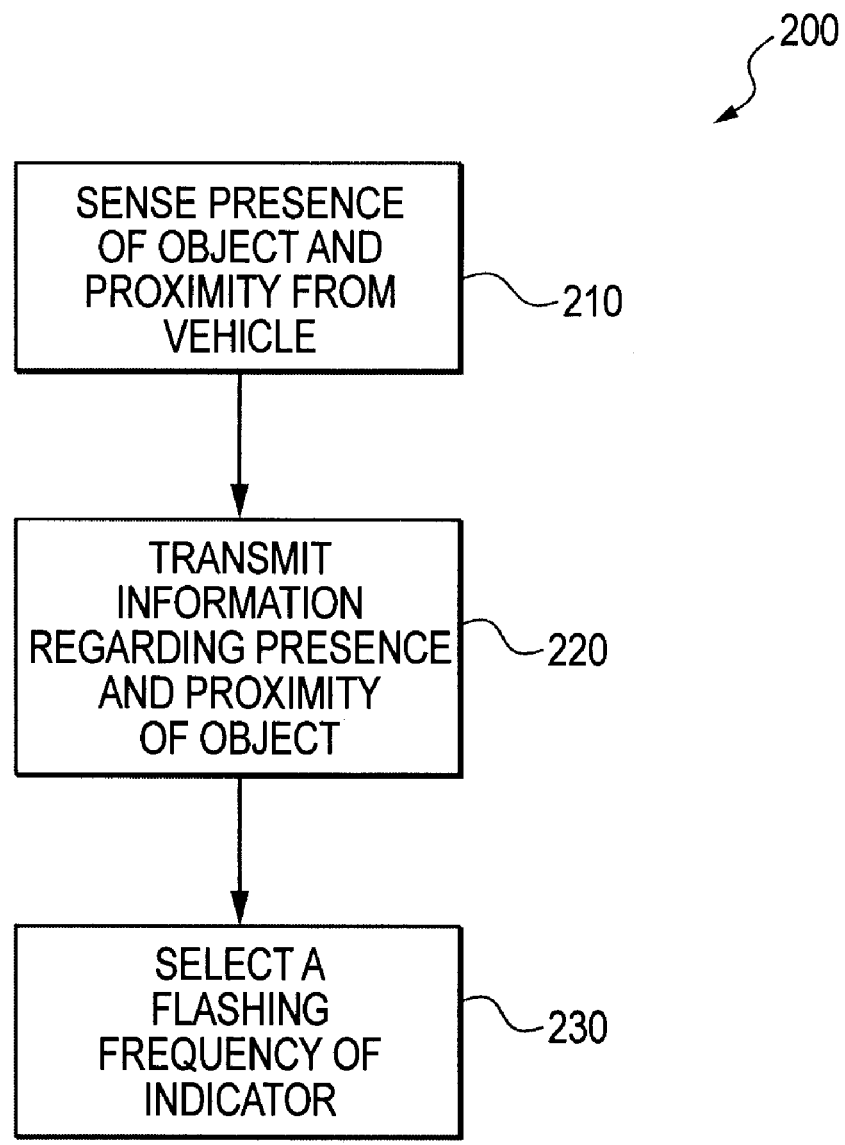
FIG. 6 is a schematic illustration of a preferred embodiment method.

FIG. 6 illustrates a preferred embodiment method for detecting the presence and proximity of an object in a detection area. The method 200 comprises sensing the presence of an object in the detection area and the proximity of the object from the vehicle. This is designated as step 210. The method 200 further comprises transmitting information concerning the presence and proximity of the sensed object. This is designated as step 220. The transmitted information is typically from a sensing system such as system 110 in FIG. 5, which is transmitted to a controller such as controller 120 in FIG. 5. The method 200 additionally comprises operating the single indicator and preferably selecting a flashing frequency for the single indicator, based upon the transmitted information to thereby provide a visual indication of the presence and the proximity of the sensed object to the vehicle. This is designated as step 230. As additionally described herein, it may be preferred to also select or otherwise change the flashing frequency based upon the proximity of the detected object. Thus, in this preferred embodiment, the flashing frequency of the indicator is selected based upon which zone the detected object is in. This aspect is described in greater detail with reference to FIG. 7.

As previously noted, the single indicator flashes or intermittently operated when one or more vehicles are detected in the corresponding detection area. Preferably, the frequency of flashing, herein referred to as the flashing frequency, is selected depending upon the proximity of the detected object(s) from the vehicle. Most preferably, the flashing frequency is increased as the proximity of the detected objects(s) increases, i.e. the detected object(s) is closer to the vehicle.

Figure 7:
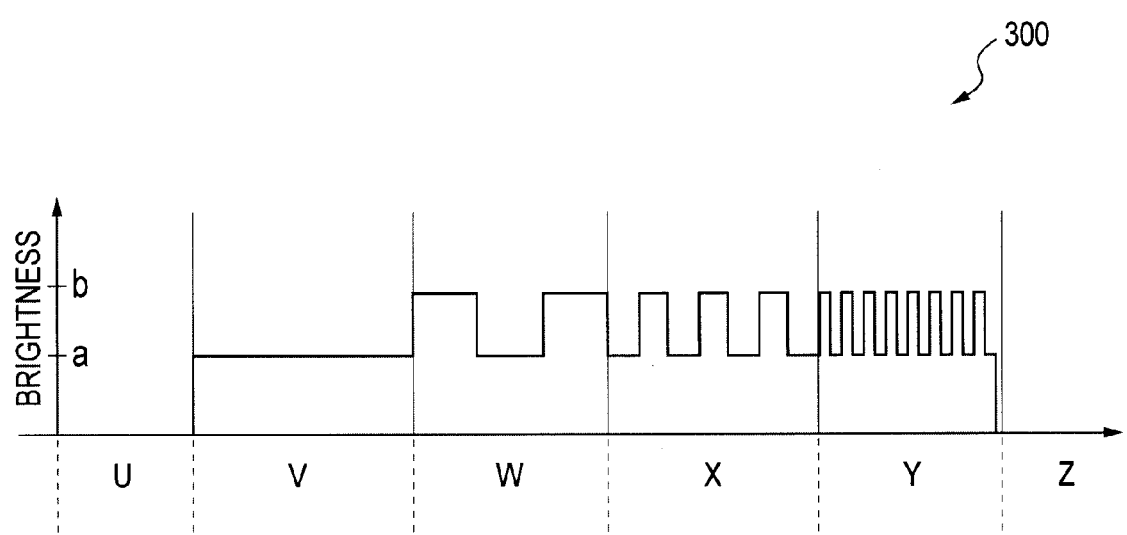
FIG. 7 is a diagram illustrating a preferred configuration for an indicator.

FIG. 7 schematically illustrates various preferred operating states for the single indicator, in accordance with the present invention. FIG. 7 depicts a configuration 300 for various operating states such as states U-Z for a single indicator such as indicator 50 in FIG. 4 or indicator 130 in FIG. 5 used in conjunction with a sensing system that partitions a detection area into multiple zones. In the preferred configuration 300 shown in FIG. 7, the operation and the brightness of the indicator is controlled depending upon whether a turn signal has been activated, whether an object has been detected in the detection area, and if so, which zone of the detection area the object is in. States U and Z illustrate operation and brightness of the indicator when no object(s) are detected in the detection area and the turn signal has not been activated, herein referred to as "off." In these states U and Z, the indicator is not activated. In state V, the sensing system detects an object in any zone of the detection area, and the turn signal is off thereby indicating that no lane change is intended. In this state V, the single indicator is operated continuously and maintained at a first brightness level a. The continuous on mode of the indicator designates that an object is currently in the detection area. In state W, the sensing system detects an object in the detection area, and specifically, in a zone that is relatively far from the vehicle, and the turn signal has been turned on, thereby indicating that a lane change is intended. In this state W, the indicator is intermittently operated or flashed, and specifically, the brightness level of the indicator is flashed from the level a to an increased brightness level b. The flashing mode and relatively low flashing frequency of the indicator designates that an object has been detected and that the object is in a far zone from the vehicle. In state X, the sensing system detects an object in the detection area, and specifically in a zone that is closer to the vehicle than the zone corresponding to state W. Also, in state X, the turn signal is on, thereby indicating that a lane change is intended. In state X, the flashing frequency of the indicator is faster than the flashing frequency of the indicator in state W. The increased flashing frequency designates an increased level of danger which the detected object presents. In state Y, the sensing system detects an object in the detection area, and specifically in a zone that is closest to the vehicle. And, in state Y, the turn signal is on. As can be seen, the flashing frequency in state Y is even faster than in state X, thereby designating a greater risk.

It is also preferred that the brightness level of the indicator be elevated or increased depending upon the level of ambient light outside, i.e. whether it is daytime or nighttime. Thus, referring to FIG. 7, if the level of outside light is such that the system determines that it is daytime, then the indicator may have a default state which is entirely off. If the system determines that it is nighttime, then the indicator may have a default state with a brightness level of a, as show in FIG. 7. Regardless of whether daytime or nighttime, when the indicator is flashed, i.e. such as in states W, X, or Y, the brightness level of the indicator is alternated by a brightness level difference referred to herein as delta.

Table 1 set forth below, depicts a preferred operation for the indicator based upon whether an object, such as another vehicle, has been sensed in the detection area and if so, in which zone; the status of the turn signal; whether a nighttime determination has been made (i.e. the "Illumination Status"), the corresponding indicator brightness, and the flashing frequency for the indicator.

TABLE 1

Preferred Operation for Indicator

| Vehicle Detection Status | Turn Signal | Illumination Status | Indicator Brightness | Indicator Flashing Frequency |
|---|---|---|---|---|
| Any Zone | OFF | OFF | Daytime | NONE |
| Any Zone | OFF | ON | Nighttime | NONE |
| Zone 1 | ON | OFF | Daytime + delta → Daytime | >Zone 2 |
| Zone 1 | ON | ON | Nighttime + delta → Nighttime | >Zone 2 |
| Zone 2 | ON | OFF | Daytime + delta → Daytime | >Zone 3 |
| Zone 2 | ON | ON | Nighttime + delta → Nighttime | >Zone 3 |
| Zone 3 | ON | OFF | Daytime + delta → Daytime | ≧0 Hz |
| Zone 3 | ON | ON | Nighttime + delta → Nighttime | ≧0 Hz |

Figure 8:
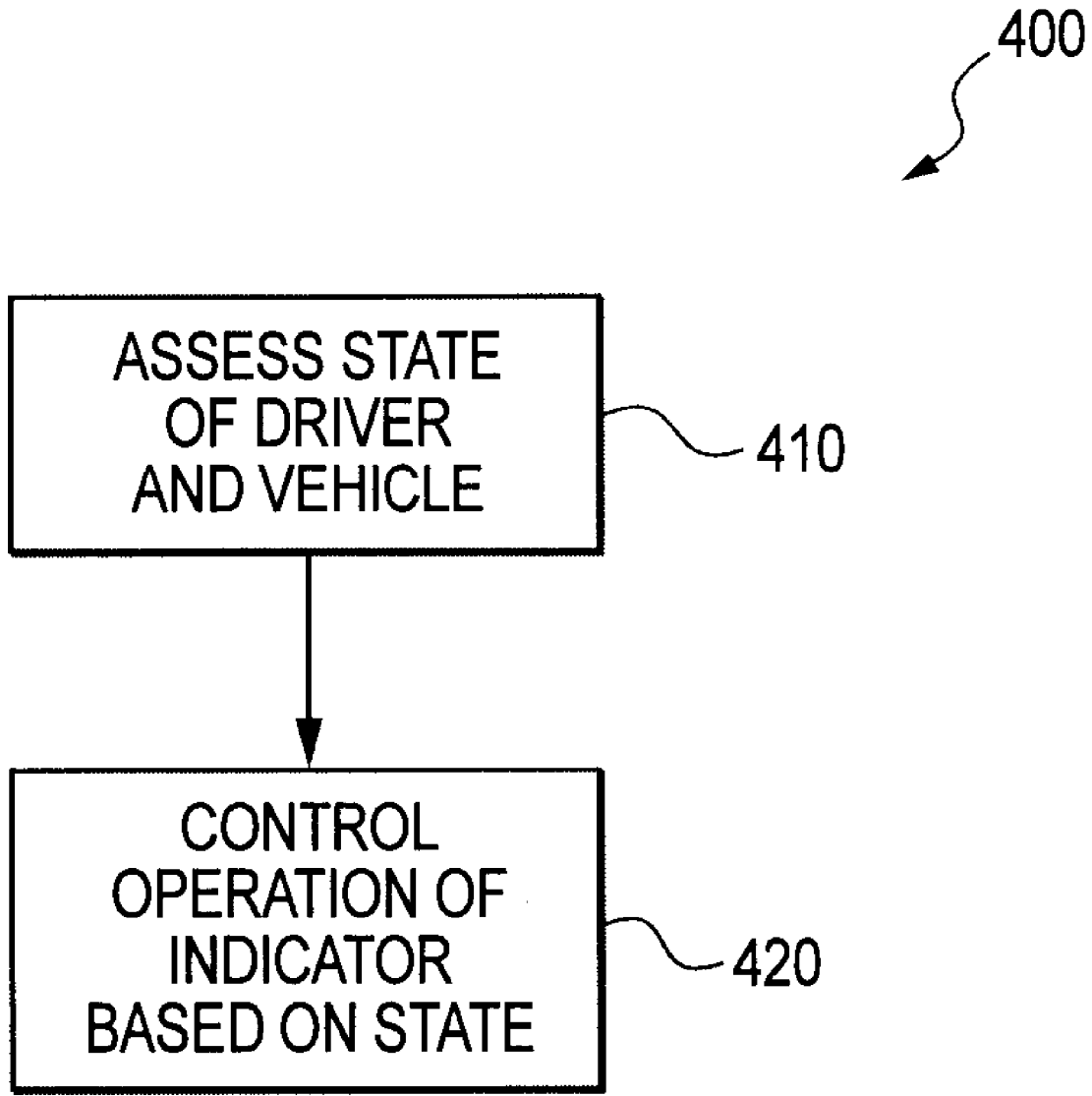
FIG. 8 is a schematic illustration of another preferred embodiment method.

FIG. 8 illustrates another preferred embodiment method 400. In this embodiment, a method for indicating the advisability of a lane change is provided. The method comprises assessing whether the driver and vehicle are in one of several states as follows. A first state is defined as when the turn signal is off and no object is detected in the detection area. A second state is defined as when the turn signal is off and an object is detected in the detection area. A third state is defined as when the turn signal is on and an object is detected in the detection area. This assessment operation is shown in FIG. 8 as 410. The method also comprises controlling the operation of the indicator such that if the first state is assessed, the indicator is not illuminated. If the second state is assessed, the indicator is then continuously illuminated. And if the third state is assessed, the indicator is then intermittently illuminated or flashed. This operation is designated as 420 in FIG. 8. These three different modes of operation of the indicator thereby provide indication as to the advisability of a lane change.

Figure 9:
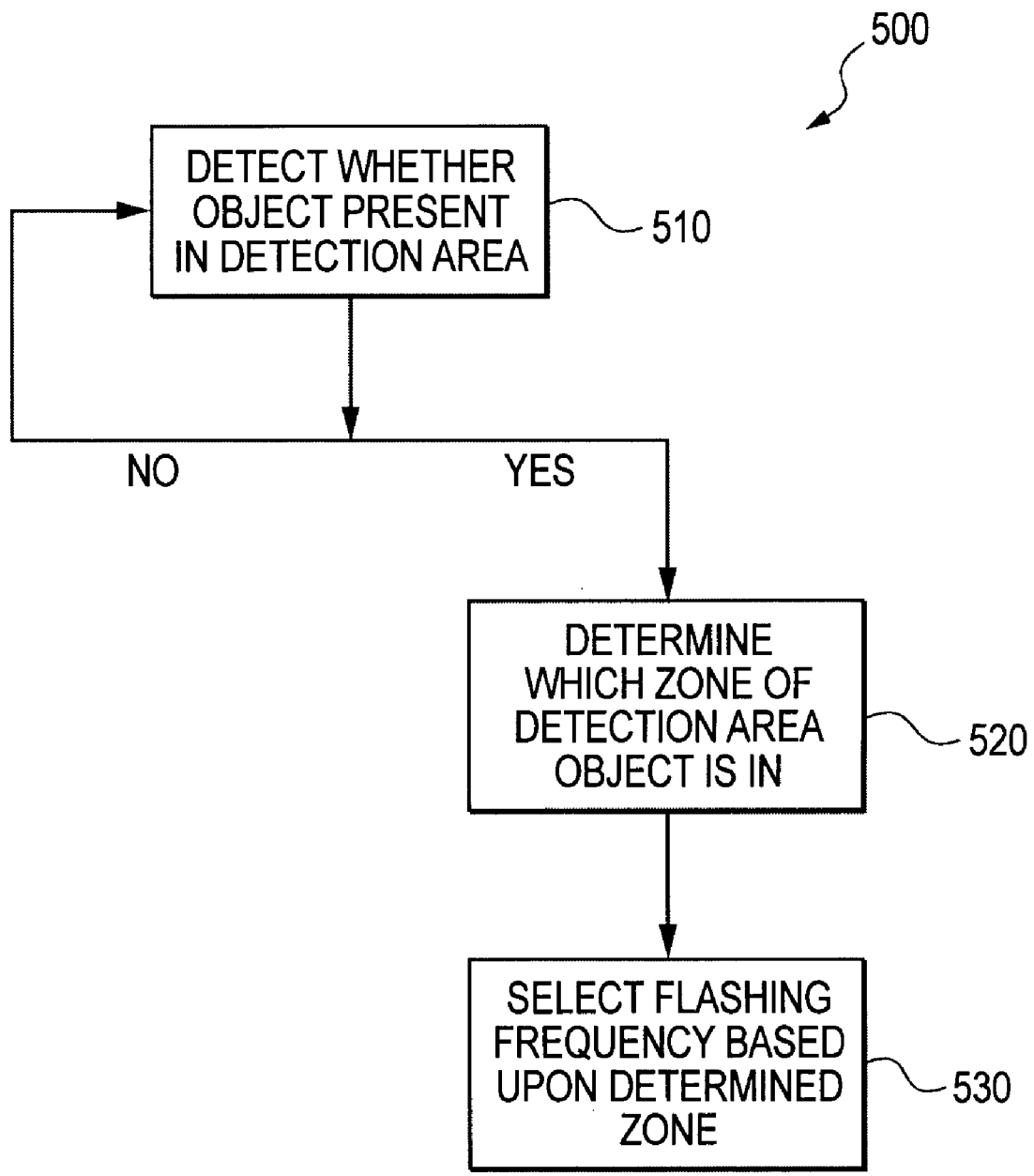
FIG. 9 is a schematic illustration of another preferred embodiment method.

FIG. 9 illustrates another preferred embodiment method 500. In this embodiment, a method is provided for indicating a degree of danger associated with a lane change by use of a single illuminating indicator. The method comprises detecting whether an object is present in a detection area and if so, determining which zone of the detection area the object is in. This is shown in FIG. 9 as 510 and 520. The method also comprises selecting a flashing frequency of the indicator based upon the determination of which zone the object is in. This is shown as 530 in FIG. 9. The flashing frequency is preferably selected such that the frequency is greater when the object is in a zone relatively close to the vehicle. And, the frequency is less when the object is in a zone farther from the vehicle. Thus, a relatively fast flashing frequency indicates an elevated degree of danger.

A wide range of flashing frequencies may be used in conjunction with the present invention. For example, for a detection area having three zones, the following range of flashing frequencies may be used:

TABLE 2

Preferred Flashing Frequencies

| Zone 1 | 2.0-5 Hz |
| Zone 2 | 1.0-2.5 Hz |
| Zone 3 | 0.5-1.5 Hz |

It will be appreciated that the invention includes flashing frequencies greater than (i.e. faster) or lesser than (i.e. slower) than the values noted in Table 2.

The present invention may utilize a wide array of light emitting elements for the indicator. For example, the element may be in the form of a light emitting diode (LED), a halogen light, an incandescent light, and/or employ indirect lighting techniques such as the use of light pipes. A preferred type of lighting element for use in the systems herein is one or more LED's. The selection of the particular LED and supporting circuitry will be within the expertise of one skilled in the art of automotive interior lighting. Accompanying the selection of one or more LED's, is a determination of the appropriate LED driver which converts the vehicle battery voltage into a suitable current for operation of the LED. Various functions may be readily incorporated into the LED circuit such as thermal protection, dimming, dimming multiple LED's, color mixing, and boost applications. Representative circuits for providing these functions are known in the art such as described in "LEDs Allow Attractive and Stylish Auto Interior Lighting": Parts 1 and 2, Automotive Design Line, Jun. 6, 2007.

Figure 10:
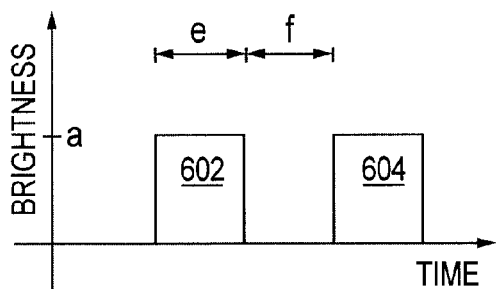
FIG. 10 is a diagram illustrating a preferred flashing configuration.
Figure 11:
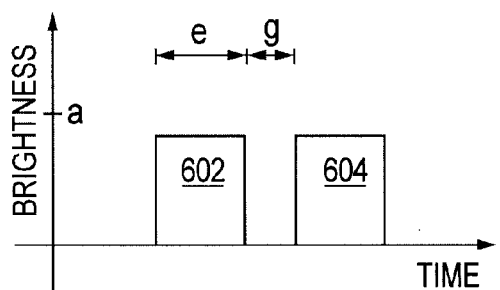
FIG. 11 is a diagram illustrating another preferred flashing configuration.
Figure 12:
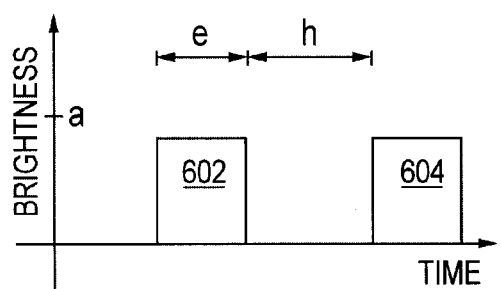
FIG. 12 is a diagram illustrating another preferred flashing configuration.
Figure 13:
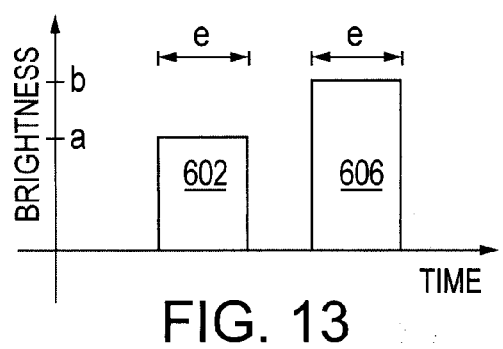
FIG. 13 is a diagram illustrating another preferred flashing configuration.
Figure 14:
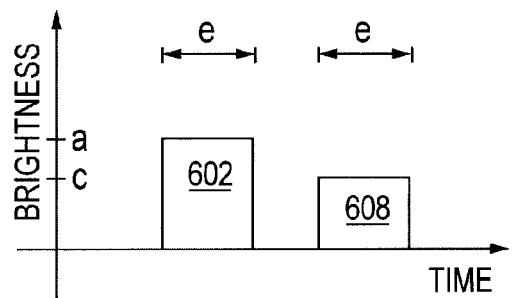
FIG. 14 is a diagram illustrating another preferred flashing configuration.
Figure 15:
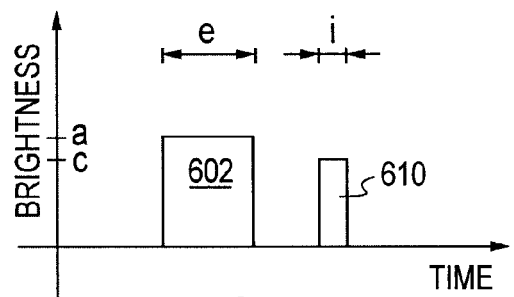
FIG. 15 is a diagram illustrating another preferred flashing configuration.
Figure 16:
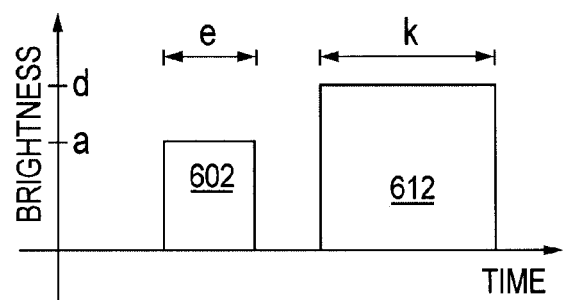
FIG. 16 is a diagram illustrating another preferred flashing configuration.
Figure 17:
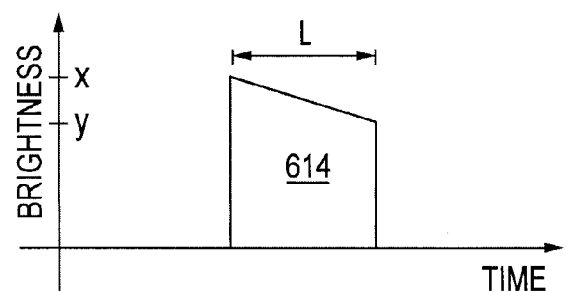
FIG. 17 is a diagram illustrating another preferred flashing configuration.

The light emitting elements may be configured to exhibit nearly any flash characteristic or combination of flash characteristics. For example, a single flash pattern may be used in which the periods of two adjacent pulses are equal or substantially so. In this family of flash patterns, the period of a flash pulse may be followed by a period of equal duration of no flash pulse, such as shown in FIG. 10. There, a first pulse 602 having a brightness or intensity a and a period e is followed by a period f before a second pulse 604 is emitted. The period of the second pulse 604 is equal or substantially equal to the period e of the first pulse 602. Periods e and f are equal or substantially so. FIG. 11 depicts a flashing configuration in which the previously described flash pulse 602 is followed by a period g of no pulse, in which e is greater than g. FIG. 12 illustrates a flashing configuration in which the pulse 602 is followed by a period h of no pulse, in which e is less than h. The flashing configuration may also include changes in brightness between pulses or groups of pulses. FIG. 13 illustrates a flashing configuration in which a second pulse 606 exhibits a brightness b that is greater than the brightness a of the first pulse 602. Both pulses 602 and 606 are depicted as having equal periods e. FIG. 14 depicts a flashing configuration in which a second pulse 608 has a lower brightness c than the first pulse 602. In addition to the noted family of single pulse patterns, the invention also includes double pulse patterns in which the period of two adjacent pulses are different. For example, FIG. 15 illustrates a flashing configuration in which a second pulse 610 having a period i follows the previously described first pulse 602. In this configuration, it will be noted that the period i of the second pulse 610 is less than the period e of the first pulse 602. Also, the brightness c of the second pulse 610 is less than the brightness a of the first pulse 602 FIG. 16 depicts a configuration in which a period k of a second pulse 612 is greater than the period e of the first pulse 602. And the brightness d of the second pulse 612 is greater than the brightness a of the first pulse 602. FIG. 17 illustrates another flashing configuration in which one or more of the flash pulses exhibit varying levels of brightness. For example, flash pulse 614 exhibits a decreasing brightness over its period L, initially being at brightness level x and decreasing to brightness level y. The present invention includes the use of flashing configurations employing any of the previously noted aspects along or in any combination. It will be appreciated that the invention includes variant versions of the noted flashing configuration such as referring to FIG. 17, the flash pulse could exhibit increasing brightness over its period. Or, rather than a linear change in brightness level, a non-linear change could be exhibited.

The present invention systems preferably utilize a single indicator. The single indicator may be used in conjunction with a single detection system for one side, e.g. the driver's side, of the vehicle. It is also contemplated to use a single indicator in combination with systems that detect and provide information concerning the vehicle blind spots on each side of the vehicle, e.g. on both the driver's side and the passenger side. For such a combined application, the indicator could be operated as described herein based upon detection of objects in either detection area. The present invention also includes the use of two indicators, each indicator associated with a detection system for a corresponding blind spot associated with the vehicle. For such versions employing dual indicators, it is preferred that each indicator be located on the dashboard or instrument panel. It is also contemplated that two indicators in such a system, could be combined or otherwise integrated together into an indicator with dual indicating portions or regions.

As previously noted, the indicator can be located anywhere in the field of view of the driver. That is, the indicator's location is not limited to the dash or instrument panel. For example, in certain applications, the indicator may be located on or near the vehicle side mirror. And, it is to be appreciated that the invention includes the use of multiple devices such as on the driver and passenger side mirrors.

The present invention may utilize an assortment of techniques and systems for detecting and assessing the proximity of objects such as other vehicles in a driver's blind spot. For example, the present invention may employ radar based detection systems such as described for example in U.S. Pat. Nos. 7,205,904; 6,838,981; 6,400,308; 6,268,804; 6,243,024; 6,067,031; 5,467,072; and 5,087,918. The present invention may also utilize infrared or thermal-based detection systems such as described for example in U.S. Pat. Nos. 7,253,722; 6,961,006; 6,927,677; 6,753,766; 6,470,273; 6,363,326; 6,038,496; and 5,463,384. The present invention may use detection and analysis systems based upon optical recognition, vision sensing or image processing techniques such as described for example in U.S. Pat. Nos. 7,106,183; 7,038,577; 6,911,642; 6,882,287; 6,859,148; 6,803,858; 6,737,964; 6,693,519; 6,424,273; 6,424,272; 5,982,278; 5,680,123; and 5,166,681. The present invention may also utilize sonic or ultrasonic based systems such as those described for example in U.S. Pat. Nos. 6,727,808; 5,734,336; and 5,235,316. The present invention may use other detection and analysis systems based upon different technologies such as satellite based vehicle positioning and detection systems as described for example in U.S. Pat. Nos. 7,295,925 and 6,370,475; laser-based vehicle detection systems such as described for example in U.S. Pat. No. 7,202,776; and systems using magnetic field variations such as described in U.S. Pat. No. 7,161,472. The present invention may employ any one or more of these systems in combination, or also utilize other detection systems not specifically referenced herein.

Many other benefits will no doubt become apparent from future application and development of this technology.

All patents, patent publications, and articles referred to herein, are hereby incorporated by reference in their entirety.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A vehicle blind spot detection and warning system, the system comprising:
   a sensing system having (i) at least one sensor affixed to a vehicle and adapted to detect the presence and the proximity of an object in a detection area defined along a lateral region adjacent to the vehicle, wherein the detection area is defined into multiple zones including a first zone being closest to the object, a third zone being farthest from the object and a second zone being between the first and third zones, and (ii) a transmitter for transmitting a signal indicative of detection by said at least one sensor of the object in said detection area and proximity of said detected object from the vehicle;
   a single light emitting indicator located within the interior of the vehicle; and
   a controller in communication with the sensing system and the single light emitting indicator; and
   wherein upon detection of the presence and the proximity of an object in said detection area, the controller receives the transmitted signal and adjusts a brightness and a flashing frequency of the single light emitting indicator based at least upon the presence and the proximity of the object, the zone the object is detected in and an illumination status, where the adjustment of the brightness is one of linear and non-linear,
   and wherein the flashing frequency of the single light emitting indicator based on the zone is such that the flashing frequency for detection of an object in the second zone is greater than the flashing frequency for detection of an object in the third zone.

2. The vehicle blind spot detection and warning system of claim 1 wherein the single light emitting indicator is affixed to a dashboard within the interior of the vehicle.

3. The vehicle blind spot detection and warning system of claim 1 wherein the light emitting indicator is of a type selected from the group consisting of (i) an LED light, (ii) a halogen light, (iii) an incandescent light, and (iv) combinations thereof.

4. The vehicle blind spot detection and warning system of claim 1 wherein the light emitting indicator emits light having a color selected from the group consisting of (i) red, (ii) yellow, (iii) blue, (iv) green, and (v) white.

5. The vehicle blind spot detection and warning system of claim 1 wherein the flashing frequency for detection of an object in the first zone is greater than the flashing frequency for detection of an object in the second zone.

6. A method for detecting the presence and proximity of an object in a detection area defined along a lateral region adjacent to a vehicle, and providing a visual indication of such presence and proximity, the method comprising:
   sensing the presence of an object in the detection area and the proximity of the object from the vehicle, the detection area further defining at least two zones wherein a first zone is nearest the vehicle and a second zone is farther from the vehicle than the first zone;

transmitting information as to the detection area and the presence and proximity of the sensed object;

selecting at least a flashing frequency and a brightness of a single light emitting indicator based at least upon the transmitted information and an illumination status to thereby provide visual indication of the presence and the proximity of the sensed object to the vehicle, wherein the brightness selected exhibits a one of linear and a non-linear change in brightness; and identifying the state of a turn signal;

wherein the selecting the flashing frequency and the brightness of the single light emitting indicator is also based upon the state of the turn signal.

7. The method of claim 6 wherein the selected flashing frequency is based upon the proximity of the sensed object to the vehicle.

8. The method of claim 7 wherein the flashing frequency selected is greater as the proximity of the sensed object to the vehicle increases.

9. A method for indicating to a driver of a vehicle a degree of danger associated with a lane change by use of a single illuminating indicator, the vehicle including a blind spot detection and warning system adapted for determining the proximity of an object in a detection area defined along a rearward lateral region adjacent the vehicle, the detection area further defining at least two zones wherein a first zone is nearest the vehicle and a second zone is farther from the vehicle than the first zone, the method comprising:

detecting whether an object is present in the detection area, and if so, determining which zone of the at least two zones the object is in; and selecting a flashing frequency and a brightness level of the single illuminating indicator based at least upon the proximity of the object, an illumination status and the determination of which zone the object is in, wherein the flashing frequency selected for the object being in the first zone is greater than the flashing frequency selected for the object being in the second zone, thereby indicating an elevated degree of danger and wherein the brightness level selected exhibits a one of linear and non-linear change in brightness.

10. The method of claim 9, wherein the detection area defines three zones with a third zone being farther from the vehicle than the second zone.

11. The method of claim 9, wherein the flashing frequency selected for the object being in the third zone is less than the flashing frequency selected for the object being in the second zone.

* * * * *